(12) United States Patent
Brueckner et al.

(10) Patent No.: US 7,539,215 B2
(45) Date of Patent: May 26, 2009

(54) SUBSCRIBER DEVICE FOR A HIGH-PERFORMANCE COMMUNICATION SYSTEM

(75) Inventors: Dieter Brueckner, Unterleiterbach (DE); Dieter Klotz, Fuerth (DE); Karl-Heinz Krause, Nuremberg (DE)

(73) Assignee: Siemens AG, Munich (DE)

( * ) Notice: Subject to any disclaimer, the term of this patent is extended or adjusted under 35 U.S.C. 154(b) by 937 days.

(21) Appl. No.: 10/825,669

(22) Filed: Apr. 16, 2004

(65) Prior Publication Data

US 2004/0198325 A1 Oct. 7, 2004

Related U.S. Application Data

(63) Continuation of application No. PCT/DE02/03751, filed on Oct. 4, 2002.

(30) Foreign Application Priority Data

Oct. 17, 2001 (DE) ................. 101 50 672
Jul. 26, 2002 (DE) ................. 102 34 148

(51) Int. Cl.
*H04J 3/24* (2006.01)
(52) U.S. Cl. .................................... 370/474
(58) Field of Classification Search ........... 370/420, 370/421, 428, 425, 385, 422, 342, 355.3, 370/345.31, 355.54
See application file for complete search history.

(56) References Cited

U.S. PATENT DOCUMENTS

| 4,326,247 A | * | 4/1982 | Chamberlin | ............... 712/42 |
|---|---|---|---|---|
| 4,581,734 A | | 4/1986 | Olson et al. | |
| 4,932,024 A | * | 6/1990 | Bonicioli et al. | ............ 370/458 |
| 5,796,735 A | * | 8/1998 | Miller et al. | ............ 370/395.4 |
| 6,167,471 A | | 12/2000 | Liu et al. | |

(Continued)

FOREIGN PATENT DOCUMENTS

DE 100 58 524 A1 6/2002

(Continued)

OTHER PUBLICATIONS

Technische Kuzbeschreibung, "IEC61491, EN 61491 SERCOS Interface", Interessengemeinschaft SERCOS Interface E. V, pp. 1-23, Republic of Germany http://www.sercos.de/pdf/sercos_kurzbeschreibung_de_0202.pdf.

*Primary Examiner*—Chirag G Shah
*Assistant Examiner*—Nima Mahmoudzadeh
(74) *Attorney, Agent, or Firm*—Sughrue Mion, PLLC

(57) ABSTRACT

A subscriber in a communication system (102) for transmitting and receiving data telegrams, wherein a data telegram includes reference data or user data and an identifier. The control of transmitting and receiving data telegrams is based on check data sets (122). A check data set includes an address for the reference data or user data and the identifier of the data telegram, which is assigned to the check data set. A transmission list (120) includes a first number of check data sets. A circuit unit (128) generates, based on a check data set of the transmission list, a data telegram to be transmitted. In addition, a second number (136, 138) of check data sets is provided. An assignment unit (140, 144) assigns a received data telegram to one of the check data sets of the second number of check data sets, wherein the assignment is carried out based on the identifier for the received data telegram.

22 Claims, 4 Drawing Sheets

U.S. PATENT DOCUMENTS

| | | |
|---|---|---|
| 6,266,727 B1 | 7/2001 | Smyers et al. |
| 6,850,513 B1 * | 2/2005 | Pelissier ..................... 370/351 |
| 7,069,305 B2 * | 6/2006 | Serizawa et al. ............ 709/213 |
| 2002/0126688 A1 * | 9/2002 | Lindgren et al. ............ 370/442 |

FOREIGN PATENT DOCUMENTS

EP          1 436 950  B1       7/2004

* cited by examiner

SUBSCRIBER DEVICE FOR A HIGH-PERFORMANCE COMMUNICATION SYSTEM

This is a Continuation of International Application PCT/DE02/03751, with an international filing date of Oct. 4, 2002, which was published under PCT Article 21(2) in German, and the disclosure of which is incorporated into this application by reference.

FIELD OF AND BACKGROUND OF THE INVENTION

The invention relates to a subscriber for a communication system, particularly an Ethernet and/or real-time Ethernet communication system, for transmitting and receiving data telegrams. The invention further relates to a communication system and a communication method.

A synchronous, clocked communication system with equidistance properties is a system comprising at least two subscribers, which are connected to one another via a data network so as to mutually exchange data or mutually transmit data. Therein, data interchange occurs cyclically in equidistant communication cycles. The communication cycles are predefined by the communication clock of the system.

Equidistant deterministic cyclic data interchange in communication systems is based on a common clock or time base for all the components involved in the communication. The clock or time base is transmitted by a distinguished component (clock generator) to the other components. In the case of an isochronal real-time Ethernet, the clock or the time base is prescribed by a synchronization master by means of transmitting synchronization telegrams.

Exemplary embodiments of subscribers include central automation devices; programming, configuration or control devices; peripheral devices such as input/output assemblies, drivers, actuators, or sensors; stored program controls (SPCs) or other control units; computers; or machines, which interchange electronic data with other machines, particularly machines which process data from other machines. The subscribers are also called network nodes or nodes.

Control units are, for example, regulator or control units of all types, switches and/or switch controllers. Exemplary embodiments of data networks are, for example, bus systems, such as field bus, process data highway, Ethernet, Industrial Ethernet, FireWire or PC-internal bus systems (PCIs), etc. In particular, an exemplary embodiment of a data network is an isochronal real-time Ethernet.

Data networks allow communication between a plurality of subscribers by networking, i.e., by connecting the individual subscribers to one another. Therein, the term "communication" means the transmission of data between the subscribers. The data to be transmitted are sent in the form of data telegrams, i.e., the data are packed together to form a plurality of packets and are sent in this form to the appropriate receiver via the data network. Therefore, these packets are also referred to as data packets. In this context, the term "transmission of data" is used synonymously with the aforementioned transmission of data telegrams or data packets.

In distributed automation systems, for example in the area of drive technology, certain data need to arrive at appropriate subscribers and be processed by the receivers at certain times. This is called real-time-critical data and data traffic, since any delayed arrival of the data at the intended location leads to unwanted results at the subscriber. This is in contrast to data communication that has no real-time criticality, for example Internet-based or intranet-based data communication.

According to IEC 61491, EN61491 SERCOS interface—Brief Technical Description, successful real-time-critical data traffic of the above-mentioned type can be ensured in distributed automation systems.

Today, automation components (e.g., controls, drives, ...) generally have an interface to a cyclically clocked communication system. An execution level of the automation component (fast-cycle) (e.g., positional regulation in a control, torque regulation in a drive) is synchronized to the communication cycle. Thereby, the communication clock is determined. Likewise, other, low-performance algorithms (slow-cycle) (e.g. temperature regulations) for the automation component can communicate with other components (e.g. binary switches for fans, pumps, ...) using this communication clock only, even though a slower cycle would be sufficient. Using just one communication clock for transmitting all the information in the system results in high demands on the transmission link's bandwidth.

Process control and monitoring in automated production and, particularly, in the field of digital drive technologies requires very fast and reliable communication systems with predictable reaction times.

German patent application DE 100 58 524.8 discloses a system and a method for transmitting data via switchable data networks, particularly the Ethernet, which permits hybrid or mixed operation of real-time-critical and non-real-time-critical data communication, in particular Internet-based and intranet-based data communication. This allows both real-time-critical (RT; real-time) and non-real-time-critical (NRT; non-real-time) communication in a switchable data network of, e.g., an distributed automation system through cyclic operation. Therein, the data network includes subscribers and coupling units.

A "transmission cycle" respectively has, for all the subscribers and coupling units in the switchable data network, at least one area for transmitting real-time-critical data and at least one area for transmitting non-real-time-critical data. Thereby, the real-time-critical communication is separated from the non-real-time-critical communication. Since all the subscribers and coupling units are always synchronized to a common time base, the respective areas for transmitting data for all the subscribers and coupling units each occur at the same time. In other words, the real-time-critical communication is independent of that of the non-real-time-critical communication with respect to time, and the real-time-critical communication is therefore not affected by the non-real-time-critical communication. The real-time-critical communication is planned in advance. The data telegrams are supplied at the original transmitter and forwarded by the involved coupling units in time-based fashion. Due to the buffer-storing in the respective coupling units, spontaneous, Internet-compatible, non-real-time-critical communication, which occurs at any time, is shifted to the transmission cycle's transmission area that is provided for non-real-time-critical communication. In addition, this communication is transmitted in that area only.

The above-cited application illustrates, by way of example, a basic structure for a transmission cycle that is split into two areas. A transmission cycle is split into a first area, which is provided for transmitting real-time-critical data, and a second area, which is provided for transmitting non-real-time-critical data. The length of the illustrated transmission cycle symbolizes its duration, which is, advantageously, between a few microseconds and a few seconds, for example, depending on the application.

The duration or time period of a transmission cycle is variable. However, the duration of the transmission cycle is defined, for example by a control computer, at least once before the point in time of transmitting the data. Moreover, the duration of the transmission cycle has the same respective length for all subscribers and coupling units in the switchable data network. The time period of a transmission cycle and/or the time period of the first area, which is provided for transmitting real-time-critical data, can be altered at any time. For example, such alteration can occur at previously planned, fixed times and/or after a planned number of transmission cycles, advantageously before the start of a transmission cycle, in that the control computer swtiches over to, e.g., other planned, real-time-critical transmission cycles.

In addition, if necessary, the control computer can re-plan the real-time communication at any time during the ongoing operation of an automation system. Thereby, the time period of a transmission cycle can be changed too. The absolute time period of a transmission cycle is a measure of the time component and/or the bandwidth of the non-real-time-critical communication during a transmission cycle, i.e., the time that is available for non-real-time-critical communication. Thus, with a time period for real-time-critical communication of 350 µs and a transmission cycle of 500 µs, for example, the non-real-time-critical communication has a bandwidth of 30%. In the case of 10 ms, the bandwidth of the non-real-time-critical communication is 97%.

In the first area, which is provided for transmitting real-time-critical data, a certain time period for transmitting data telegrams that organize the data transmission is reserved, prior to transmitting the actual real-time-critical data telegrams. By way of example, the data telegrams for organizing the data transmission contain data for time synchronization of the subscribers and coupling units in the data network and/or data for topology recognition in the network.

After these data telegrams have been transmitted, the real-time-critical data telegrams are transmitted. Since, as a result of the cyclic operation, the real-time communication can be planned in advance, the transmission times and/or the times for forwarding the real-time-critical data telegrams are known, prior to the start of data transmission, for all real-time-critical data telegrams to be transmitted. In other words, the time period of the area for transmitting non-real-time-critical data is automatically defined by the time period of the area for transmitting real-time-critical data.

It is an advantage of this arrangement that only the respective necessary transmission time for the real-time-critical data traffic is used. After the real-time-critical data traffic has ended, the remaining time is automatically available for non-real-time-critical communication, for example for unplannable Internet communication and/or other, non-real-time-critical applications. It is a particular advantage that the time period of the area for transmitting real-time-critical data is respectively determined by the data that are to be transmitted on a connection-specific basis. In other words, the time period of the two areas is determined, for each individual data link, by the required data volume for the real-time-critical data to be transmitted. Thereby, the time split for the two areas can be different for each individual data link of each transmission cycle.

Only the respective, necessary transmission time for the real-time-critical data traffic is used. The remaining time of a transmission cycle is automatically available for non-real-time-critical communication, for example for unplannable Internet communication and other, non-real-time-critical applications for all subscribers in the switchable data network.

Since the real-time communication is planned in advance such that the arrival of the real-time-critical data telegrams in the respective coupling units is planned so that the real-time-critical data telegrams under consideration arrive at the respective coupling units no later than the forwarding time, the real-time-critical data telegrams can be transmitted or forwarded without any interim time window. Thereby, due to the tightly-packed transmission and/or forwarding, the available time period is used in the best possible way. Naturally, if necessary, it is also possible to incorporate transmission breaks between the transmission of the individual data telegrams.

As a representation for any network, the basic manner of operation in a switched network is explained below, by way of example, with reference to two subscribers (e.g., a drive and a control computer) that have respective integrated coupling units, and with reference to a further subscriber without a coupling unit, which are connected to one another by data links.

The coupling units each have local memories, which are connected to the subscribers via internal interfaces. The subscribers use the interfaces to interchange data with the respective coupling units. Within the coupling units, the local memories are connected to the control circuits via the data links. The control circuits receive data and/or forward data via the internal data links from and/or to the local memories or via one or more of the external ports. By applying the method of time synchronization, the coupling units always have a common synchronous time base. If a subscriber has real-time-critical data, then these real-time-critical data are picked up, via the respective interface and the local memory, from the appropriate control circuit at the preplanned time during the area for the real-time-critical communication. From there, the real-time-critical data are transmitted to the next connected coupling unit via the respectively provided external port.

If another subscriber transmits non-real-time-critical data, for example for an Internet request, at the same time, i.e., during the real-time-critical communication, then these non-real-time-critical data are received by the control circuit via the external port and are forwarded via an internal communication to the local memory, where they are buffer-stored. From there, they are picked up again only in the area for the non-real-time-critical communication, and then forwarded to the receiver. In other words, the non-real-time-critical data are shifted to the second area of the transmission cycle, which is reserved for spontaneous, non-real-time-critical communication. Thereby, interference with the real-time communication is prevented.

If not all the buffer-stored, non-real-time-critical, data can be transmitted during that area of a transmission cycle that is provided for transmitting the non-real-time-critical data, then the non-real-time-critical data are buffer-stored in the local memory of the respective coupling unit, until they can be transmitted during an area of a later transmission cycle that is provided for transmitting the non-real-time-critical data. This reliably prevents interference with the real-time communication.

The real-time-critical data telegrams which arrive, via respective data links and via the external ports, at the associated coupling unit's control circuit, are forwarded directly via the respective external ports. This is possible because the real-time communication is planned in advance. Hence, for all the real-time-critical data telegrams to be transmitted, the transmission and reception times; all of the respective coupling units involved; all of the forwarding times; and all the receivers of the real-time-critical data telegrams are known.

The advance planning of real-time communication also ensures that no data collisions occur on the data links. Likewise, the forwarding times for all the real-time-critical data packets from the respectively involved coupling units are planned in advance and are, thus, clearly defined. Therefore, the arrival of the real-time-critical data telegrams is planned such that the real-time-critical data telegrams under consideration arrive in the respective coupling unit's control circuit no later than the forwarding time. As a result, the problem of time ambiguities, which become noticeable particularly in the case of long transmission chains, is eliminated. Consequently, as stated above, simultaneous operation of real-time-critical and non-real-time-critical communication in the same switchable data network, and any connection of additional subscribers to the switchable data network are possible without having a disruptive effect on the real-time communication itself.

The method described in German patent application DE 100 58 524.8 allows to set up Ethernet-based communication networks, in particular isochronal Ethernet-based communication networks. The subscribers of these networks interchange data records with very high frequency and make them available to the user. Therein, the hardware support permits the user interface to have a throughput that can keep up with the maximum possible telegram volume of the connected links. With four connected 100 Mbit full duplex links and frames of 64 bytes in length, for example, the telegram volume is approximately 1 000 000 telegrams/s. In contrast to this, the throughput of software/communication-stack-based user interfaces for spontaneous communication is at least two orders of magnitude smaller.

However, these high throughput rates are available only for isochronal cyclic communication, for which, at the reception end too, preplanned reception times for telegrams are strictly observed. This means that the telegram transmission requires a network that can perform the method of time-based connection described in the German patent application DE 100 58 524.8. However, a high-performance user interface, which is also able to cooperate with existing networks that have an address-based interconnection, is highly desirable.

OBJECTS OF THE INVENTION

It is therefore one object of the invention to provide an improved subscriber for a communication system that allows for particularly high data rates. It is another object of the invention to provide an associated communication system and communication method.

SUMMARY OF THE INVENTION

According to one formulation of the present invention, these and other objects are achieved by a subscriber for a communication system that transmits and receives data telegrams. Each of the data telegrams has reference data and an identifier, wherein a control of transmitting and receiving the data telegrams is based on check data records and wherein a respective one of the check data records has an address for the reference data and the identifier of a respective one of the data telegrams that is assigned to the respective one of the check data records. The subscriber includes a transmission list, which includes a first number of the check data records. Based on one of the first number of check data records in the transmission list, a circuit unit generates one of the data telegrams to be transmitted. Further, an assignment unit assigns a received data telegram to one of a second number of check data records. Therein, the assignment is based on the identifier of the received data telegram.

The present invention makes it possible to implement a high-performance communication system with telegram rates, which, by way of example, allow applications for real-time communication in automation systems. Therein, it is a particular advantage that this can be done by means of a standard communication system, such as the Ethernet. For high-performance communication purposes, one or more subscribers are equipped with an interface in accordance with the invention. Therein, it is not required that all the subscribers in the communication system have such an interface. This has the particular advantage that already existent subscribers can be used.

In accordance with a preferred embodiment of the invention, the interface for the high-performance communication of at least one subscriber of the communication system contains a transmission list that includes check data records. Each check data record contains control information for a telegram and a description (address, length) of the reference data or user data. In particular, the control information includes an identifier (frame ID) for the telegram to be transmitted. The address indicates, by way of example, the memory area for the reference data or user data to be transmitted, which need to be retrieved from the subscriber's communication memory. Preferably, the transmission list is processed by the subscriber on a cyclically repetitive basis.

Therein, it is a particular advantage that, based on a check data record, a data telegram can be generated immediately, i.e., "on the fly", since a check data record contains all the information required to generate a data telegram. Preferably, in addition to the data telegram's identifier, this information is further header information.

In accordance with a preferred embodiment of the invention, a check data record is input into a logic circuit, so that the logic circuit uses the address to access the reference data or user data to be transmitted and logically combines the user data and the identifier and/or the further header information to form a data telegram.

Therein, it is a particular advantage that, after the transmission list is activated, an entire set of data telegrams can be transferred. Because of the check data records and the hardware support by the logic circuit, this transfer takes place at a very high data rate.

Accordingly, data telegrams can also be received at a high data rate. This too is made possible by check data records, which, preferably, are stored in the at least one subscriber. Based on its identifier, a received data telegram is assigned to a respective check data record, which indicates the address for the reference data or user data. The user data can then be stored at this address, for example in the subscriber's communication memory.

In accordance with another preferred embodiment of the invention, the transmission list has control data records that determine the order of processing of the check data records in the transmission list. Preferably, there are one or more control data records in the transmission list. The control data records prompt conditional jumps in the transmission list in order to determine the processing of the control data records in the transmission list.

In accordance with a preferred embodiment of the invention, the cycles for processing the transmission list are counted and, based thereon, the condition for a jump in the transmission list is checked. Therefore, a jump can only occur at every nth cycle, for example, wherein n can be chosen by masking bit positions of the cycle number.

In accordance with another preferred embodiment of the invention, the check data records for reception purposes are stored in groups. When a data telegram is received, an index is formed that addresses the group of check data records that are appropriate for the received data telegram. Preferably, the index is formed based on the data telegram's identifier.

BRIEF DESCRIPTION OF THE DRAWINGS

Exemplary embodiments of the invention are explained below with reference to the drawings, in which.

DETAILED DESCRIPTION OF THE PREFERRED EMBODIMENTS

Figure 1:
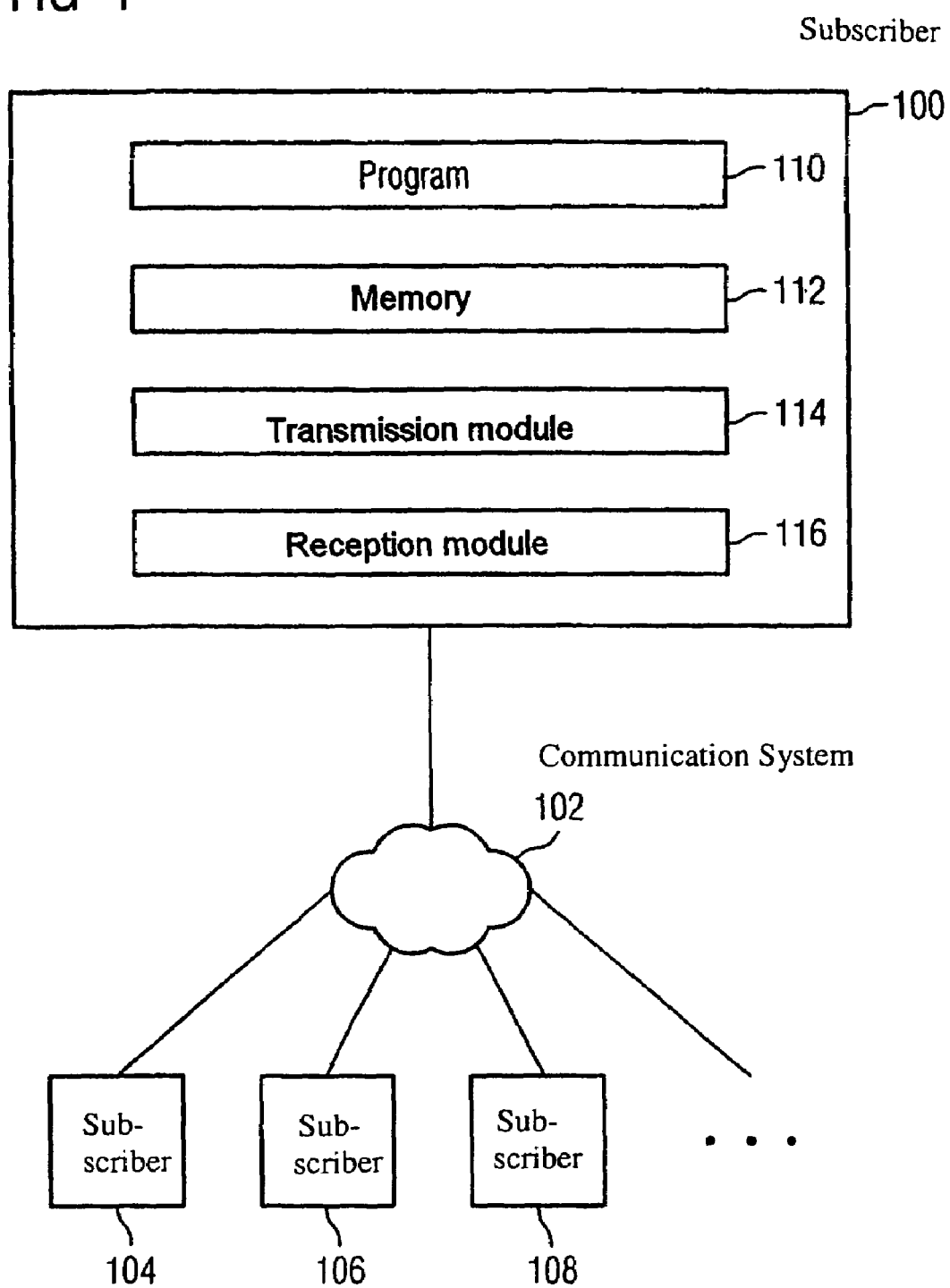
FIG. 1 shows a block diagram of an exemplary embodiment of a subscriber according to the invention in a communication system.

FIG. 1 shows a subscriber 100 of a communication system 102, to which further subscribers 104, 106, 108, ... are connected. The communication system 102 can be a standard Ethernet, for example.

The subscriber 100 contains an application program 110, which can access a memory 112 in the subscriber 100. Therein, the memory 112 can be a so-called "communication memory".

The subscriber 100 also contains a transmission module 114 and a reception module 116. The transmission module 114 and the reception module 116 are formed in a way that data telegrams are transmitted, by the subscriber 100 via the communication system 102, and received at a data rate that can otherwise be achieved only for planned real-time communication.

The subscriber 100 can be a control unit in an automation system, for example. The subscribers 104, 106, 108, ... can be further control units, so-called "intelligent drives", actuators, sensors or other components in automation technology. Real-time control or regulation of such an automation system requires a high data rate for the communication between the subscribers.

By way of example, the subscribers 104, 106, 108, ... can be sensors which send data telegrams to the subscribers 100 at time intervals of one millisecond, for example. The subscriber 100 therefore needs to be able to receive the respective data telegrams and to store the user data in the memory 112. Accordingly, the subscriber 100 must be able to address the subscribers 104, 106, 108, ... with the appropriate bandwidth, in particular if the subscribers 104, 106, 108, ... form a synchro control with various slave drives.

It is a particular advantage that subscribers, which are equipped only with a standard Ethernet interface, can be connected to the communication system 102 too. It is another advantage that participation in the communication system 102 does not require any temporal synchronization of the subscribers or switches with a transmission response that is independent of the traffic volume. It is thus possible to connect a subscriber 100 in accordance with the invention with an existing standard Ethernet, for example, in order to achieve an increase in the data throughput.

Figure 2:
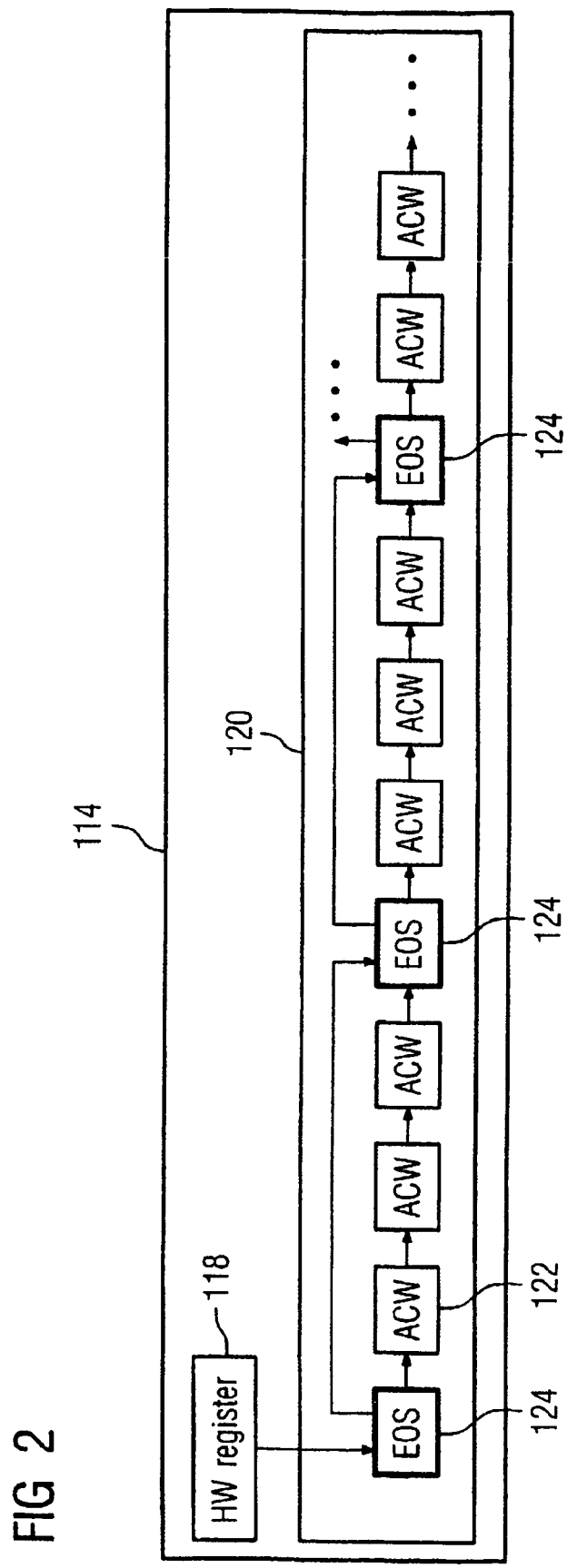
FIG. 2 shows a transmission list for the subscriber.

FIG. 2 shows an exemplary embodiment of the transmission module 114 of FIG. 1. The transmission module 114 has a hardware register 118 for storing an entry address or jump address pointing to the start of a transmission list 120. The transmission list 120 is constructed from check data records 122, which are also referred to as Application Frame Control Words (ACW). A check data record 122 contains at least an address and an identifier. By means of the identifier, the check data record 122 is assigned to a data telegram that has the same identifier. The address in the check data record 122 indicates the memory address for the data telegram's reference data or user data. In addition, the check data record 122 can contain further header information for the data telegram.

The sequential arrangement of the check data records 122 thus forms a transmission list 120, since each check data record 122 in the transmission list 120 uniquely specifies the data telegram to be transmitted. The transmission list 120 is sequentially processed by the subscriber 100 (cf. FIG. 1), starting with the first check data record 122 on the list. When the transmission list 120 has been completely processed, processing returns to the start of the transmission list 120, in order to process the transmission list 120 again. This operation is repeated cyclically.

Besides the check data records 122, the transmission list 120 preferably contains control data records 124, which are also called Ends of Segment (EOSs). A control data record 124 contains a jump address to another control data record 124 in the transmission list 120 or to a check data record 122 in the transmission list 120. The jump to the jump address is executed only if a condition is satisfied, which is also specified in the control data record 124. Thus, by means of the control data records 124, the transmission list 120 can be programmed such that different check data records 122 are processed with different frequency. Thereby, data telegrams with various identifiers and various repetition frequencies can be generated. This is of particular advantage if not all subscribers on the communication system 102 (cf. FIG. 1) require the same high data rate or if not all subscribers on the communication system 102 are able to process the same high data rate.

Figure 3:
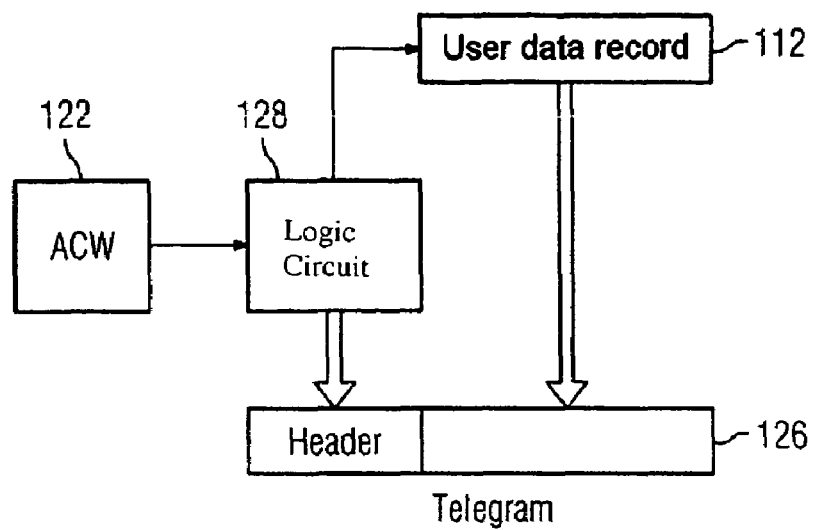
FIG. 3 shows a logic circuit of the subscriber for generating data telegrams to be transmitted.

FIG. 3 illustrates a data telegram 126 that is to be transmitted and which is generated by a logic circuit 128 in the transmission module 114. The check data record 122 in the transmission list 120 (cf. FIG. 2) that is currently to be processed is input into the logic circuit 128. Based on the address contained in the check data record 122, the logic circuit 128 accesses the memory 112 in the subscriber 100 (cf. FIG. 1) in order to read the respective reference data or user data from the memory 112.

Together with the identifier contained in the check data record 122 and, if necessary, with any further header information, these reference data or user data are assembled to form the data telegram 126, which can then be sent by the subscriber 100. Therein, it is a particular advantage that, by means of the logic circuit 128, the identifier and, if necessary, the further header information can be added "on the fly" to the reference data or user data to be transmitted, so that, in particular, time-consuming copying operations can be avoided.

Figure 4:
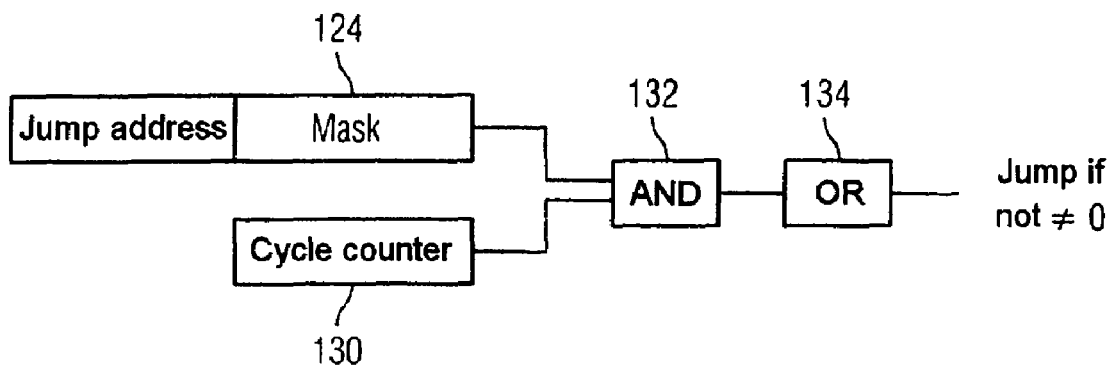
FIG. 4 shows a block diagram of a circuit for checking a jump condition in the transmission list.

FIG. 4 shows an exemplary embodiment of a control data record 124 (cf. FIG. 2) and the processing thereof. The control data record 124 contains a jump address and a mask. The transmission module 114 (cf. FIG. 1) contains a cycle counter 130 for evaluating the control data record 124.

The cycle counter 130 is incremented whenever the transmission list 120 has been processed in full (cf. FIG. 2). By way of example, the cycle counter has a width of eight bits. The mask in the control data record 124 indicates which of the bit positions in the cycle counter 130 are used for checking the condition.

By way of example, the mask is "00000111", i.e., only the three least significant bits of the cycle counter 130 are used for the evaluation. The individual bits of the mask and of the current reading on the cycle counter 130 are subjected to a logic AND operation, bit by bit, in the gate 132. The individual outputs of the gate 132 are then subjected to an OR operation in the gate 134. Thus, the output of the gate 134 is a logic "1" when just one bit of the three least significant bits in the current cycle of the cycle counter 130 is also a logic "1". The output of the gate 134 reaches the value of a logic "0" only when the three least significant bits of the cycle are at "000". This is the case on every eighth cycle only.

There is a jump to the jump address indicated in the control data record 124 only when the output of the gate 134 is a logic "1", i.e., in all cases, except when the three least significant bits of the cycle counter 130 read "000". Thus, the check data records 122 skipped in this manner are processed only in every eighth cycle, so that the respective data records are sent with respectively reduced frequency. Only those check data records 122 in the transmission list 120 that are not skipped are processed with the cycle's full repetition frequency.

Figure 5:
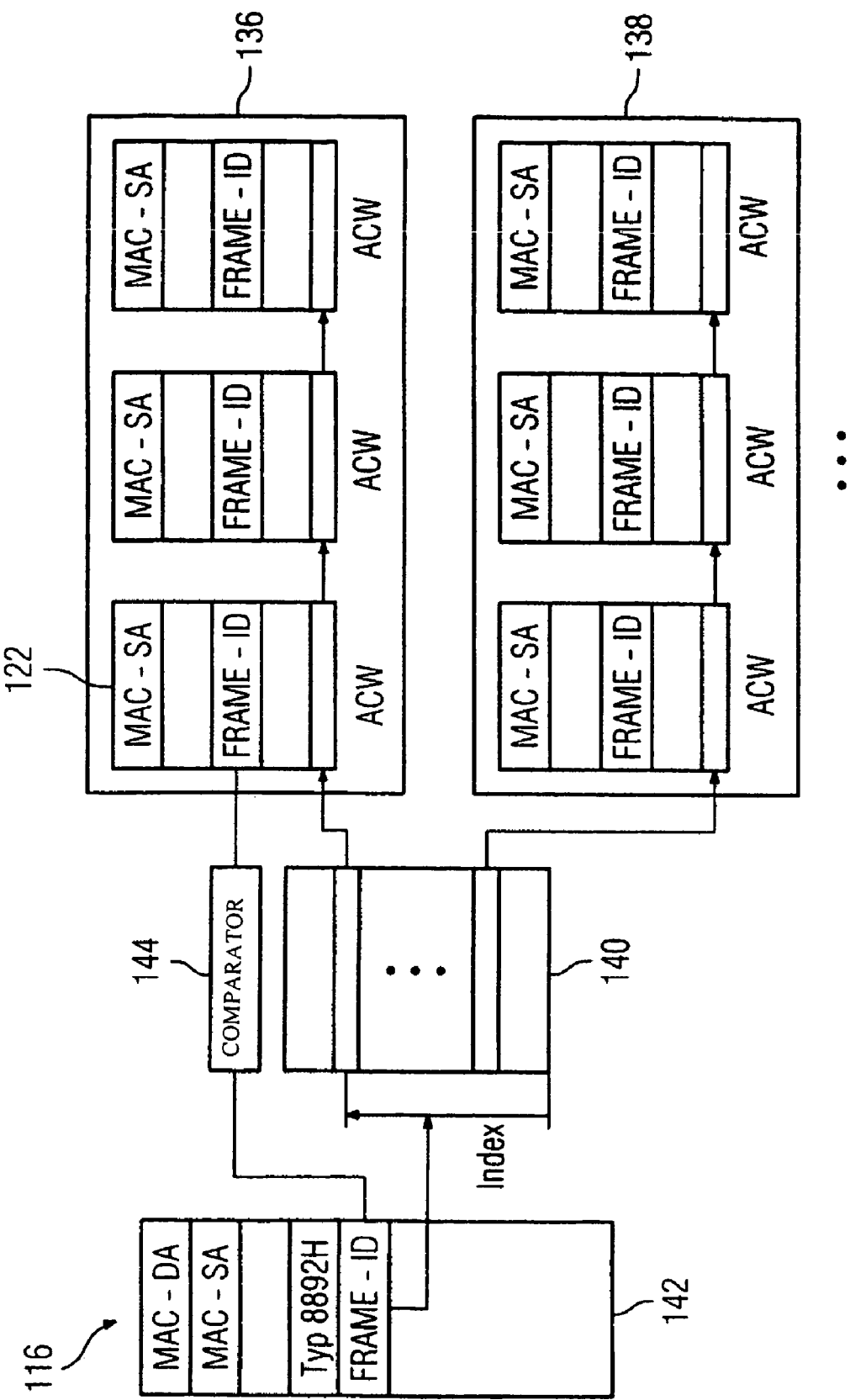
FIG. 5 shows a block diagram for associating a received data telegram with a control data record via an index.

FIG. 5 shows an exemplary embodiment of the reception module 116 in FIG. 1. The reception module 116 has an index 140 and groups 136, 138, . . . of check data records 122. In principle, the check data records have the same structure as the check data records in the transmission list 120 (cf. FIG. 2). Each of the check data records 122 has an identifier for the data telegram that is to be assigned to the check data record 122 in question. This identifier is also called "FRAME-ID". This identifier can be globally unique. Alternatively, in addition to the identifier, the target address must be evaluated, which is called MAC-SA.

The check data records 122 are grouped based on the identifiers. If the identifiers have a length of eight bits, for example, then, by way of example, the least significant three bits of the identifier are used to form the groups 136, 138, . . . in that $2^3$ of such groups are formed in accordance with the $2^3$ combinational possibilities for allocating the three least significant bits.

By way of example, the group 136 contains those check data records 122 that contain identifiers ending in "000". The group 138 contains those check data records 122 that contain identifiers ending in "001", etc. Thus, in the instant case being considered, eight such groups of check data records 122 are formed.

The entry or jump addresses for the groups 136, 138, . . . are stored in the index 140.

When a data telegram 142 is received by the subscriber 100 (cf. FIG. 1), the index 140 is accessed in the reception module 116. Therein, the three least significant bit positions in the identifier of the data telegram 142 are used as a key. If the three least significant bits in the identifier of the data telegram 142 are "000", for example, then the index 140 refers to the group 136.

This group 136 is then searched for check data records 122, which have the same identifier as the identifier of the data telegram 142. This can be done by means of a comparator 144. If the identifier is not a globally unique identifier, then, additionally, it must be checked whether or not the MAC-SA matches.

Therein, it is a particular advantage that, because of the grouping of the check data records 122, not all of the check data records 122 present in the reception module 116 need to be checked for a matching identifier. Rather, only those control data records 122 need to be checked that are contained in the group that is referred to by the index 140 for a certain occupancy of the least significant bit positions of the identifier in the data telegram 142. In this way, the search for the check data record 122, which is associated with the data telegram 142, can take place in a particularly rapid manner.

When the check data record 122 associated with the data telegram 142 has been ascertained in this manner, the reference data or user data contained in the data telegram 142 are stored at the memory address that is indicated in the check data record 122.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A subscriber for a communication system for transmitting and receiving data telegrams, wherein each of the data telegrams has reference data and an identifier, wherein a control of transmitting and receiving the data telegrams is based on check data records, the subscriber comprising:

a transmission list, which includes a first number of the check data records, where each of the check data records has an address identifying a memory location that stores the reference data that is to be placed in a respective data telegram and the identifier which uniquely identifies the respective one data telegram of the data telegrams that is assigned to the respective one of the check data records;

a circuit unit configured to generate one of the data telegrams to be transmitted, based on one of the first number of check data records in the transmission list;

a second number of the check data records provided for reception separate from the first number of check data records provided for transmission;

an assignment unit configured to assign a received data telegram to one of the second number of the check data records, wherein the assignment is based on the identifier of the received data telegram, wherein check data records of the second number of the check data records are stored in groups, wherein access to a check data record is effected by an index, and wherein a group of the check data record is determined based on the identifier of the received data telegram.

2. The subscriber as claimed in claim 1, wherein the communication system comprises at least one of an Ethernet and a real-time Ethernet.

3. The subscriber as claimed in claim 1, wherein the transmission list is processed within a cycle.

4. The subscriber as claimed in claim 1, wherein the transmission list has at least one control data record, which determines the order of processing the first number of the check data records.

5. The subscriber as claimed in claim 4, wherein the control data record includes a conditional jump address to a check data record of the first number of the check data records.

6. The subscriber as claimed in claim 5, further comprising a cycle counter, wherein the control data record is formed such that a jump to the jump address occurs in every nth cycle.

7. The subscriber as claimed in claim 6, wherein the control data record is in a form such that the nth cycle is chosen by masking bit positions of a cycle number.

8. A communication system having a plurality of subscribers for transmitting and receiving data telegrams, wherein each of the data telegrams has reference data and an identifier;

wherein a control of transmitting and receiving the data telegrams by at least one of the subscribers is based on check data records;

wherein each of the check data records has an address identifying a memory location that stores the reference data that is to be placed in a respective data telegram and the identifier which uniquely identifies the respective one data telegram of the data telegrams that is assigned to the respective one of the check data records;

wherein the at least one subscriber comprises:

a transmission list, which includes a first number of the check data records;

a circuit unit configured to generate one of the data telegrams to be transmitted, based on one of the first number of check data records in the transmission list;

a second number of the check data records provided for reception separate from the first number of check data records provided for transmission and an assignment unit configured to assign a received data telegram to one of the second number of the check data records, wherein the assignment is based on the identifier of the received data telegram:

wherein check data records of the second number of the check data records are stored in groups;

wherein access to a check data record is effected by an index: and wherein a group of the check data record is determined based on the identifier of the received data telegram.

9. The communication system as claimed in claim 8, wherein the communication system comprises at least one of an Ethernet and real-time Ethernet.

10. The communication system as claimed in claim 8, wherein the transmission list is processed within a cycle.

11. The communication system as claimed in claim 8, wherein the transmission list has at least one control data record, which determines the order of processing the first number of the check data records.

12. The communication system as claimed in claim 11, where the control data record includes a conditional jump address to a check data record of the first number of the check data records.

13. The communication system as claimed in claim 12, further comprising a cycle counter, wherein the control data record is formed such that a jump to the jump address occurs in every nth cycle.

14. The communication system as claimed in claim 13, wherein the control data record is in a form such that the nth cycle is chosen by masking bit positions of a cycle number.

15. A method for transmitting and receiving data telegrams by a subscriber of a communication system, wherein each of the data telegrams has reference data and an identifier, wherein a control of transmitting and receiving the data telegrams by the subscriber is based on check data records, the method comprising:

generating by a computer one of the data telegrams to be transmitted, based on one of a first number of the check data records of a transmission list, where each of the check data records has an address identifying a memory location that stores the reference data that is to be placed in a respective data telegram and the identifier which uniquely identifies the respective one data telegram of the data telegrams that is assigned to the respective one of the check data records; and assigning a received data telegram to one of a second number of the check data records provided for reception separate from the first number of check data records provided for transmission, wherein the assignment is based on the identifier of the received data telegram, wherein, for accessing a check data record from the second number of the check data records, an index is accessed in order to ascertain a group, to which the check data records belongs, and wherein the index is formed on the basis of the identifiers of the data telegrams.

16. The method as claimed in claim 15, wherein the transmission list is processed within a cycle.

17. The method as claimed in claim 15, wherein the order of processing the first number of the check data records is determined by at least one control data record in the transmission list.

18. The method as claimed in claim 15, wherein a conditional jump to a check data record of the first number of the check data records occurs when a condition for the check data record is satisfied.

19. The method as claimed in claim 18, further comprising checking for satisfaction of the condition based on a cycle counter.

20. The subscriber as claimed in claim 1, wherein:

the identifier of a corresponding check data record is a globally unique identifier corresponding to only one data telegram, the second number of the check data records only used for the received data telegrams is grouped such that the received data telegram is first matched with a corresponding group of the check data record based only on least significant bits in the identifier of the received data telegram and only then with a corresponding unique record based on the identifier, each of the check data records is an application frame control word, and the transmission list is sequentially processed by sequentially generating data telegrams for each of the check data records in the transmission list and wherein the received data telegrams are processed based on a reception list comprising the second number of check data records.

21. The subscriber as claimed in claim 1, wherein the transmission list has at least one control data record, which determines sequence of transmitting the data telegrams corresponding to the first number of the check data records and wherein the control data record further includes a conditional jump address to a next check data record of the first number of the check data records where at least one check record of the first number of the check data records is skipped so as to process the next check record.

22. The subscriber as claimed in claim 1, wherein the transmission list has at least one control data record which prompts conditional jumps between check data records of the first number of the check data records in the transmission list and which determines sequence of processing of the first number of the check data records in the transmission list.

* * * * *